United States Patent
Hansen

(10) Patent No.: US 9,504,315 B2
(45) Date of Patent: Nov. 29, 2016

(54) ADJUSTABLE GAS SPRING, HEIGHT-ADJUSTABLE COLUMN WITH GAS PRESSURE SPRING, AND FURNITURE WITH HEIGHT-ADJUSTABLE COLUMN

(71) Applicant: KESSEBÖHMER PRODUKTIONS GMBH & CO KG, Weilheim/Teck (DE)

(72) Inventor: Melf Hansen, Gondelsheim (DE)

(73) Assignee: KESSEBÖHMER PRODUKTIONS GMBH & CO. KG, Weilheim/Teck (DE)

( * ) Notice: Subject to any disclaimer, the term of this patent is extended or adjusted under 35 U.S.C. 154(b) by 0 days.

(21) Appl. No.: 14/890,790

(22) PCT Filed: May 13, 2013

(86) PCT No.: PCT/EP2013/059804
§ 371 (c)(1),
(2) Date: Nov. 12, 2015

(87) PCT Pub. No.: WO2014/183775
PCT Pub. Date: Nov. 20, 2014

(65) Prior Publication Data
US 2016/0088930 A1    Mar. 31, 2016

(51) Int. Cl.
*A47B 9/00* (2006.01)
*A47B 9/10* (2006.01)
*F16F 9/02* (2006.01)

(52) U.S. Cl.
CPC .............. *A47B 9/10* (2013.01); *F16F 9/0245* (2013.01)

(58) Field of Classification Search
CPC ............ A47B 9/00; A47B 9/02; A47B 9/10; A47B 9/20; A47B 21/02; A47B 27/16
See application file for complete search history.

(56) References Cited

U.S. PATENT DOCUMENTS

| | | |
|---|---|---|
| 1,590,296 A | 6/1926 | Klein |
| 3,593,980 A | 7/1971 | McHenry |
| 5,379,980 A | 1/1995 | Houghton, Jr. |
| 5,413,316 A | 5/1995 | Easter |

(Continued)

FOREIGN PATENT DOCUMENTS

| | | |
|---|---|---|
| CN | 200987471 Y | 12/2007 |
| CN | 102102724 A | 6/2011 |

(Continued)

OTHER PUBLICATIONS

International Search Report in corresponding patent application PCT/EP2013/059804 dated Feb. 18, 2014, issued in German and English-language.

(Continued)

*Primary Examiner* — Daniel Rohrhoff
(74) *Attorney, Agent, or Firm* — Hassan Abbas Shakir; Katten Muchin Rosenman LLP

(57) ABSTRACT

An adjustable gas pressure spring includes a gas pressure spring portion, a gas reservoir and a connecting means fluidically connecting the gas reservoir and the gas pressure spring portion with each other. The spring force of the gas pressure spring portion is adjustable by means of pressure equalization with the gas reservoir and/or the ambient pressure. Such a gas spring is provided in an adjustable column, in particular an adjustable table column. The table column is in turn provided in a height-adjustable table.

16 Claims, 5 Drawing Sheets

(56) References Cited

U.S. PATENT DOCUMENTS

| | | | | |
|---|---|---|---|---|
| 5,538,115 | A | 7/1996 | Koch | |
| 6,267,337 | B1* | 7/2001 | Kulhavy | A47B 9/10 248/161 |
| 6,378,446 | B1* | 4/2002 | Long | A47B 9/02 108/147 |
| 7,246,779 | B2* | 7/2007 | Doyle | A47B 9/04 108/144.11 |
| 8,210,109 | B1* | 7/2012 | Dewees | A47B 9/10 108/147 |
| 2006/0272497 | A1* | 12/2006 | Adams | F15B 15/227 92/109 |
| 2008/0245279 | A1* | 10/2008 | Pan | A47B 9/00 108/144.11 |
| 2011/0041739 | A1* | 2/2011 | Verweij | A47B 9/04 108/147.19 |
| 2011/0139957 | A1* | 6/2011 | Friesen | A47B 9/10 248/634 |
| 2015/0164218 | A1* | 6/2015 | Bonuccelli | A47B 9/20 108/147.19 |

FOREIGN PATENT DOCUMENTS

| | | |
|---|---|---|
| DE | 4311625 | 10/1994 |
| DE | 19959512 A1 | 6/2001 |
| DE | 20307373 | 9/2003 |
| DE | 10 2011 103 308 A | 12/2012 |
| EP | 1923594 A2 | 5/2008 |
| EP | 2250925 | 11/2010 |

OTHER PUBLICATIONS

International Preliminary Report on Patentability for corresponding application PCT/EP2013/059804 dates Nov. 26, 2015.

Office Action issued Sep. 18, 2016 by State Intellectual Property Office of the Peoples Republic of China in Chinese counterpart application 201380076491.1, partial translation provided.

* cited by examiner

ADJUSTABLE GAS SPRING, HEIGHT-ADJUSTABLE COLUMN WITH GAS PRESSURE SPRING, AND FURNITURE WITH HEIGHT-ADJUSTABLE COLUMN

BACKGROUND OF THE INVENTION

1. Field of the Invention

The invention relates to a gas pressure spring, an adjustable table column with a gas pressure spring and an adjustable piece of furniture. In particular, the invention relates to a table with an adjustable column.

2. Discussion of the Related Art

Pieces of furniture, such as office tables, desks or workbenches etc. are commonly provided height-adjustable, for example for reasons of working efficiency. Namely, there are height-adjustable tables, which, for example, include multipart table columns. Such table columns are usually formed such that a column element of the table column is configured to be insertable into another column. Of course, other designs are conceivable, according to which the individual column elements can be moved past one another or into one another, which are also covered by the present invention.

The height adjustment of furniture, in particular tables, may be performed either manually or by motor. The respective amount of force required for shifting upward in a vertical direction, that is, for raising, should be reduced if possible. For that reason elements such as spring elements, in particular gas pressure springs, are provided in the columns, which counteract a weight force on the column.

These springs, in particular gas pressure springs, have a certain spring force, which is primarily defined by their internal pressure. Said spring force is adapted to the weight of, for example, a table plate and the components or attachments arranged thereon. However, it must be defined in advance which weight loads are loaded on the column and therefore on the spring. This requires an individual manufacturing of various table columns. Per se, a table column of a workbench generally has to bear a higher weight load than an ordinary office desk. However, such an individual manufacturing of springs and table columns requires greater effort during manufacture, assembly and storage.

SUMMARY OF THE INVENTION

It is therefore an object of the present invention to provide a gas pressure spring that can solve the above problem and to provide a simplified manufacturing process of height-adjustable furniture, in particular tables, or of height-adjustable columns.

An adjustable gas spring according to the present invention comprises a gas spring portion, a gas reservoir and a connecting means. The connecting means fluidically connects the gas reservoir and the gas spring portion to each other. That is, a fluid, i.e., a gas and/or liquid, is communicable between the gas reservoir and the gas spring portion of the gas pressure spring. The spring force of the gas spring portion is adjustable by means of pressure equalization with the gas reservoir or also to the ambient pressure. In particular, an increase in the pressure in the gas spring portion results in an increase of the spring force for higher loads and a decrease in pressure, for example the ambient pressure, results in a decrease of the spring force and therefore in a decreased weight compensation by the gas pressure spring. In this way, the spring force of the gas pressure spring may be adjusted individually for each application without having to install various components. This can allow an improved production flow during the manufacturing process or an improved process of assembly on site.

In addition, the gas reservoir may include an adjusting means, which is able to adjust the pressure in the gas reservoir. Further, the gas reservoir may also be an external gas reservoir, for example, an external gas cylinder, which is reversibly connectable to the gas spring portion of the gas spring via appropriate connecting means such as valves. As an alternative, in one embodiment, the adjustment means of the gas reservoir is a piston which is configured to be pushed into the gas reservoir or pulled out from the gas reservoir. The adjustment of the piston may be simply performed by inserting or withdrawing the piston into or out of the gas reservoir as in a piston cylinder. Alternatively, the piston may include a thread, which engages with a nut thread in the gas reservoir, in particular in the casing of gas reservoir, and, as such, may be screwed into the gas reservoir or screwed out of the gas reservoir.

By using the adjusting means or by attaching an external gas cylinder as gas reservoir, it is always possible to adjust, readjust or pre-adjust the spring force of the gas pressure spring.

In particular, a pressure may be set by the manufacturer after assembly on the factory side or, in particular using the adjusting means formed by an insertable piston, may be introduced on the client side. In particular, the adjusting means may also allow engaging with a crank, a screwdriver, a battery-powered screwdriver or other screwing or engaging means. This can simplify the operation of the adjusting means by the customer, in particular the user of the piece of furniture.

Of course it is also conceivable that the adjustment of the adjusting means may be motor-driven, so that it can be quickly and reliably regulated by the user of the piece of furniture. Thus fluctuating weight loads of the piece of furniture may be responded to quickly and easily without overloading components of the table, a height adjustment of the table or another piece of furniture being too difficult or a downward adjustment being too fast with the risk of damage to the table and adjacent components.

The connecting means between the gas spring portion and the gas reservoir is advantageously a tube element, in particular a flexible tube element, so that the connecting means remain reliably functional even during height adjustment.

In particular, it is also conceivable that the adjustment of the gas pressure in the gas spring portion and/or in the gas reservoir can be changed in various ways, for example, pneumatically, hydraulically or mechanically.

Advantageously, for better reproducibility the adjustment means may also be a piston rod which is guided in the gas reservoir or the housing of the gas reservoir by means of a linear guide. Such guiding of the piston rod may allow for an improved adjustment of the gas reservoir.

Furthermore, an operating force means may be provided which aids a movement of the adjusting means, in particular a movement of the adjusting means causing an increase in pressure in the gas reservoir. This can facilitate an adjustment of the pressure in the gas reservoir and thus an adjustment of the spring force of the gas pressure spring.

Said operating force means may, in a further development, comprise spring means such as a torsion spring or a linear spring, for example, depending on which embodiment of the adjusting means is preferred.

In one embodiment of the present invention, in which the gas reservoir is separable from the spring portion of the gas pressure spring, the gas spring portion may comprise a valve element. Thus, simple connecting of the gas reservoir can be accomplished, without a loss of function of the gas pressure spring, when a gas reservoir is not connected.

An adjustable gas pressure spring can also have a locking means. The locking means of the gas pressure spring may be lockable in at least one position. That is, the gas pressure spring may be held in this position, which may cause a locking of the height adjustment of the table. Preferably, the locking means can also be lockable in a plurality of positions, in particular continuously in any or all positions.

Thus, a possibility of locking the table is provided. Frequently lockable gas pressure springs, which are releasable, for example, by means of a handle attached to the table, are used.

According to the present invention a height-adjustable column is provided, in particular a table column, which has at least two column elements, which herein are referred to as lower column element and upper column element. The terms "lower" and "upper" refer to a vertical direction, wherein "lower" always refers to the direction in which the column rests on a base and "upper" means a direction in which a weight load rests on the column, that is, in case of a table column usually a table plate or the like. Said column elements according to the invention are movable relative to each other and there is also a gas pressure spring portion arranged such that the spring force of the gas pressure spring counteracts a weight load on the table column, that is, a weight load from above. Thus, the gas pressure spring portion is preferably oriented in a vertical direction. Hence, the weight load resting on the column can be compensated by adjusting the spring force of the gas pressure spring.

The gas pressure spring may be provided either entirely or at least partially in one of the column elements of the column. It is also conceivable that the gas spring is only partially provided in one of the column elements, for example, only in the gas pressure spring portion, but not in the gas reservoir. The gas pressure spring or at least the components of the gas pressure spring integrated in one of the columns are preferably provided in an inner column element in order to not interfere with a movement of the column elements relative to one another. An inner column element is a column element that is closest to the center in a radial direction extending from the longitudinal axis of the column to the outside.

It is also conceivable that the column is a two-stage or multi-stage column, so that more than two column elements are provided. The principle of the invention is analogously applicable to such multi-stage columns.

In a further development of the invention, the columns may be motor-driven columns, wherein a motor performs the height adjustment of the column. Alternatively, the column may be manually adjustable in height.

A piece of furniture according to the present invention is, for example, a height-adjustable table. Such a table includes at least one column with a gas pressure spring, as described above, as well as a table plate, which is located above the column.

In certain embodiments it is conceivable that a plurality of height-adjustable columns is provided in the table, wherein at least one of the columns, preferably a plurality of columns and in particular all columns, include at least one gas pressure spring portion if a gas pressure spring. Furthermore, in addition to a table column provided with an adjustable gas pressure spring at least one column comprising a commercially available, non-adjustable gas pressure spring may be provided. The various columns can be connected by a synchronization means. Thus, different weight compensation may be performed by the different columns and an adjustability and reliability of the table may be improved or enhanced.

In addition, in a further development of the invention, a gas reservoir is provided, which is connected to a plurality of gas pressure spring portions or, preferably, may be connected to all gas pressure spring portions of gas pressure springs according to the present invention. The connection between the gas reservoir and the gas pressure spring portions is also provided as a fluidic connection in the most general sense of the word.

Advantageously, the gas reservoir may be provided and/or be formed integrally with the table frame or other attachment parts of the table.

In a further development of the invention, the table further comprises a synchronization means, in particular a belt synchronization means, which harmonizes the height adjustment of the table by synchronizing a plurality of height-adjustable table columns. This can allow for an easier adjustment of the table.

The synchronization means may be used between the individual columns both for the controlled movement and for conveying the spring forces, which are applied only unilaterally. This opens up the possibility, among other things, to mount a second additional gas pressure spring in a second, hitherto empty, column. Particularly, this may be used in case of large table plate weights. As such, the additional gas spring an also the lockable gas pressure spring may be provided adjustable according to the invention. Within the load limits of the individual components, this can result in reduced costs for production and material.

In particular, synchronization can also be performed between columns which are not provided with an adjustable gas pressure spring according to the invention. Thus, one or more of the columns have no gas pressure spring or a non-adjustable gas pressure spring. Also, instead of non-adjustable gas springs, other counterbalancing means may be provided in other columns, such as conventional coil springs or the like.

In addition, a weight meter and/or a weight indicator may be provided at a table according to the invention and/or at an adjustable column according to the invention in accordance with one embodiment. Thus, an actual weight load on the table or the table column may be measured and/or the weight load may be displayed. This allows control of the adjustments of the gas pressure spring.

Furthermore, an indicator for indicating the pressure in the gas pressure spring can be provided at the table and/or at the adjustable column and/or on the gas pressure spring according to the invention, in particular at the gas pressure spring portion. This indicator can also be configured such that it does not indicate pressure but weight compensation adjusted via the pressure in a different unit, for example, Newton or Kilogram, etc.

It is also conceivable that an indicator is provided at the table of the adjustable column and/or at the gas pressure spring, which indicates both an actual weight load of the table and the adjusted weight compensation. In particular, this can be provided in a common display. Furthermore, a simple indication can be done by displaying a first display state, when the weight load on the table or on the column corresponds to the weight balance adjustments of the gas pressure spring, that is, when they are sufficiently similar.

"Sufficiently similar" in this context means that the gas spring has an adjustment that can counteract a weight load of the table such that, in case of a height adjustment, for example, the table plate does not experience an uncontrollable drop, when a weight load on the plate is too high, or an uncontrollable movement upward, when, for example, a weight load on the plate is too low and the spring force exceeds the weight considerably. If there is no such sufficient similarity between the adjusted weight compensation force and the actually acting weight force, a second display state pointing to this fact can be realized in the indicator. For example, a first state can be indicated by a color, for example green, shown when the weight load and the adjusted spring force correspond to each other. A second state can be indicated by a color, for example red, signalling that the weight load and the adjusted spring force are significantly different and that there is a risk of damage or injury.

A non-limiting example of a sufficient agreement of the pre-adjusted weight compensation and the actual load can be a correspondence, which has a smaller deviation than 50%, preferably less than 30%, in particular less than 20%.

Of course, in other embodiments a multi-level display can be performed, for example, for displaying transition areas between a sufficient correspondence and large deviations of the adjusted value from the actual load.

Furthermore, in other embodiments of the present invention, a securing means may also be provided at the table. It may be configured such that an adjustment of the column is only possible, if the weight compensation adjustment of the gas pressure spring and the actual weight load on the desk are sufficiently similar. This can reduce the risk of incorrect usage or carelessness, thus reducing the risk of injury and damage.

Furthermore, a height-adjustable table may comprise a locking means which is configured such that the position of the table plate in a vertical direction can be locked. This means that the column may either be locked in predetermined positions or is adjustable in arbitrary, continuous steps and lockable in any position. Said locking means and securing means as described above may be different components or the same component.

Advantageously, the locking means may be connected to the synchronization means for synchronizing the column movement and can be lock it if necessary. This can be done in case of belt synchronization by means of a so-called belt lock.

The locking means may comprise a gas pressure spring in one embodiment. The gas pressure spring of the locking means may further be lockable in at least one position, preferably in a plurality of positions, or continuously in all positions. In addition, the gas pressure spring of the locking means may also be adjustable by means of a gas reservoir, for example, the gas reservoir of the adjustable gas pressure spring. Here, the gas pressure spring may be the adjusted such that the locking means does not hold the table in a position, but merely attenuates the movement and inhibits it only when needed. The locking means may be provided in one embodiment in a table of columns, particularly in an inside column. So the advantages of the invention without can be realized without having to accept aesthetic compromises.

In particular, the locking means may be coupled to a gas pressure spring according to the invention, be formed thereon or be formed integrally therewith, or may be acting on the gas pressure spring. Thus, the locking means of the table may also cause a locking or blocking of the furniture or of a column according to the invention by locking the gas pressure spring or a part thereof, in particular the gas pressure spring portion or the gas pressure spring piston.

In case of a plurality of gas pressure springs according to the invention in a table, wherein at least one of the gas pressure springs according to the invention does not have the adjustable embodiment, a locking means may be alternatively or additionally provided at the non-adjustable gas pressure spring. Alternatively, a non-adjustable column may be a lockable column without a separate or additional locking means being provided at the table.

BRIEF DESCRIPTION OF THE DRAWINGS

Further advantages, developments and preferred embodiments of the invention will be described below with reference to the figures.

In the drawings.

DETAILED DESCRIPTION OF THE INVENTION

Figure 1:
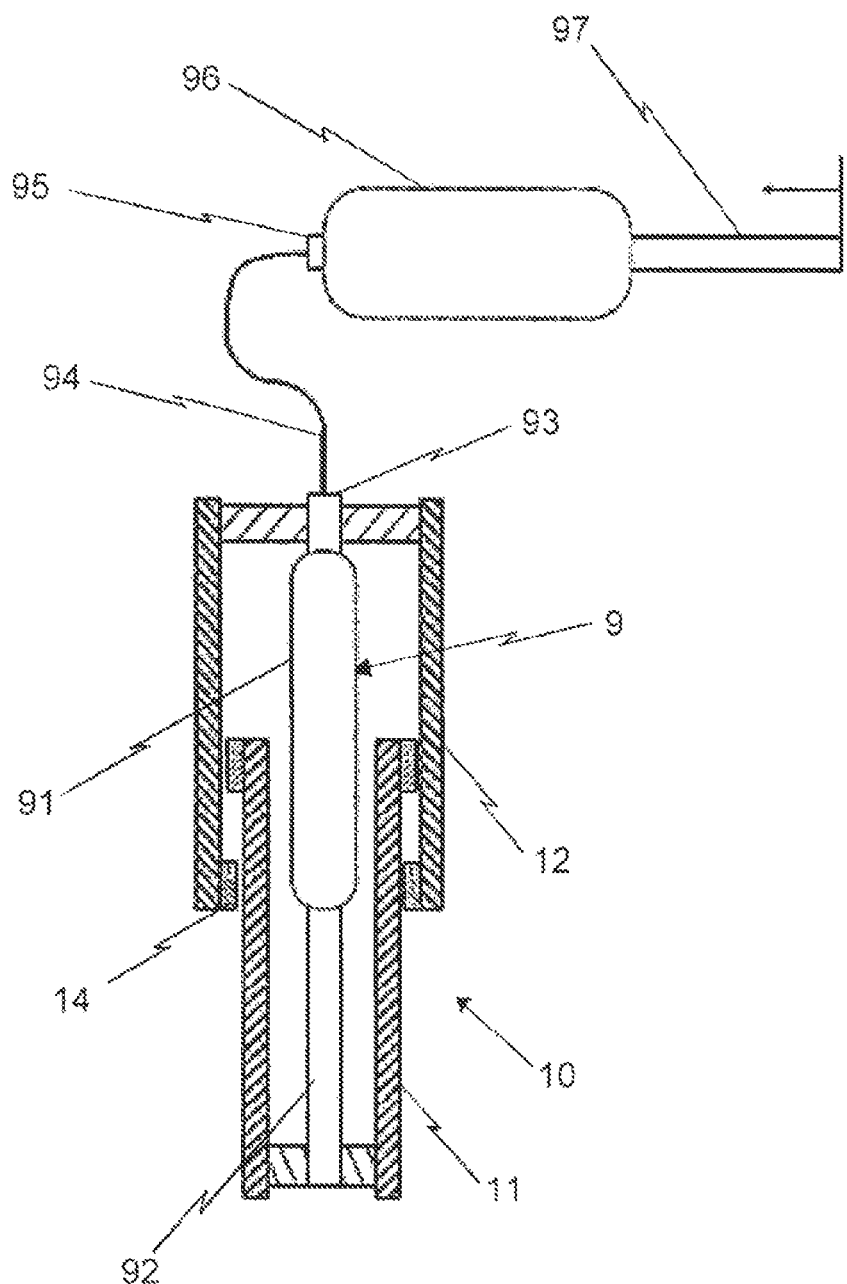
FIG. 1 shows a schematic of an adjustable gas pressure spring according to one embodiment of the invention.

FIG. 1 shows an adjustable gas pressure spring 9 in accordance with an embodiment of the invention. Here, the gas pressure spring 9 is exemplified in a telescopic column 10, as will be described in more detail later. This telescopic column 10 comprises a lower column element 11 and an upper column element 12, wherein the column elements 11, 12 are displaceable against each other. In the present case the lower column element 11 is configured such that its outer circumference is smaller than the inner circumference of the upper column element 12 and, as such, the lower column element is receivable in the upper column element 12. In addition, a stopper 14 is provided which prevents an overextension of the lower column element 11 out of the upper column element 12, or vice versa. However, the lower column may be formed larger than the upper column so that the lower column can accommodate the upper column.

Here, in the column elements 11, 12, a gas pressure spring portion is formed along a center axis of the column elements in the shape of a cylinder 91. At an upper end of the cylinder 91, a cylinder valve 93 is formed. At an upper end of the upper column element 12, the cylinder 91 is connected to the upper column element 12. At a lower end of the cylinder 91, a piston 92 extends from the cylinder 91 in the downward direction. One end of the piston 92 is accommodated in the cylinder 91. The far end of the piston 92 with respect to the cylinder 91 is connected to a lower portion of the lower column element 11.

In alternative embodiments, the arrangement of the gas pressure spring portion 91, 92 may also, for example, be reversed.

A connecting means 94 is formed extending from the cylinder valve 9, which, in the embodiment shown, is a tube, in particular a hose for compressed air. At the far end of the connecting means 94 with respect to the cylinder valve 93 it is connected to another valve 95. This valve 95 connects the tube to a gas reservoir 96. Thus, when the valves 95, 93 are open, the gas reservoir 96 and the cylinder 91 are fluidically connected.

The gas reservoir 96 in turn is formed like a cylinder and comprises a piston rod 97 in the embodiment shown. The piston rod 97 is configured to be insertable into the gas reservoir 96 and withdrawable from the gas reservoir 96. In accordance with the cylinder/piston principle inserting the piston rod 97 is connected to increasing the pressure in the gas reservoir in an area of the gas reservoir 96 adjacent to the valve 95. Analogously a pressure decrease in the gas reservoir occurs when the piston is withdrawn or screwed out.

In an alternative embodiment, a connection for an additional external pressure reservoir may be provided instead of the piston rod. Also, the piston rod may have a thread, which corresponds to a thread in the gas reservoir 96, so that the piston rod is configured to be screwed into the gas reservoir 96.

Figure 2:
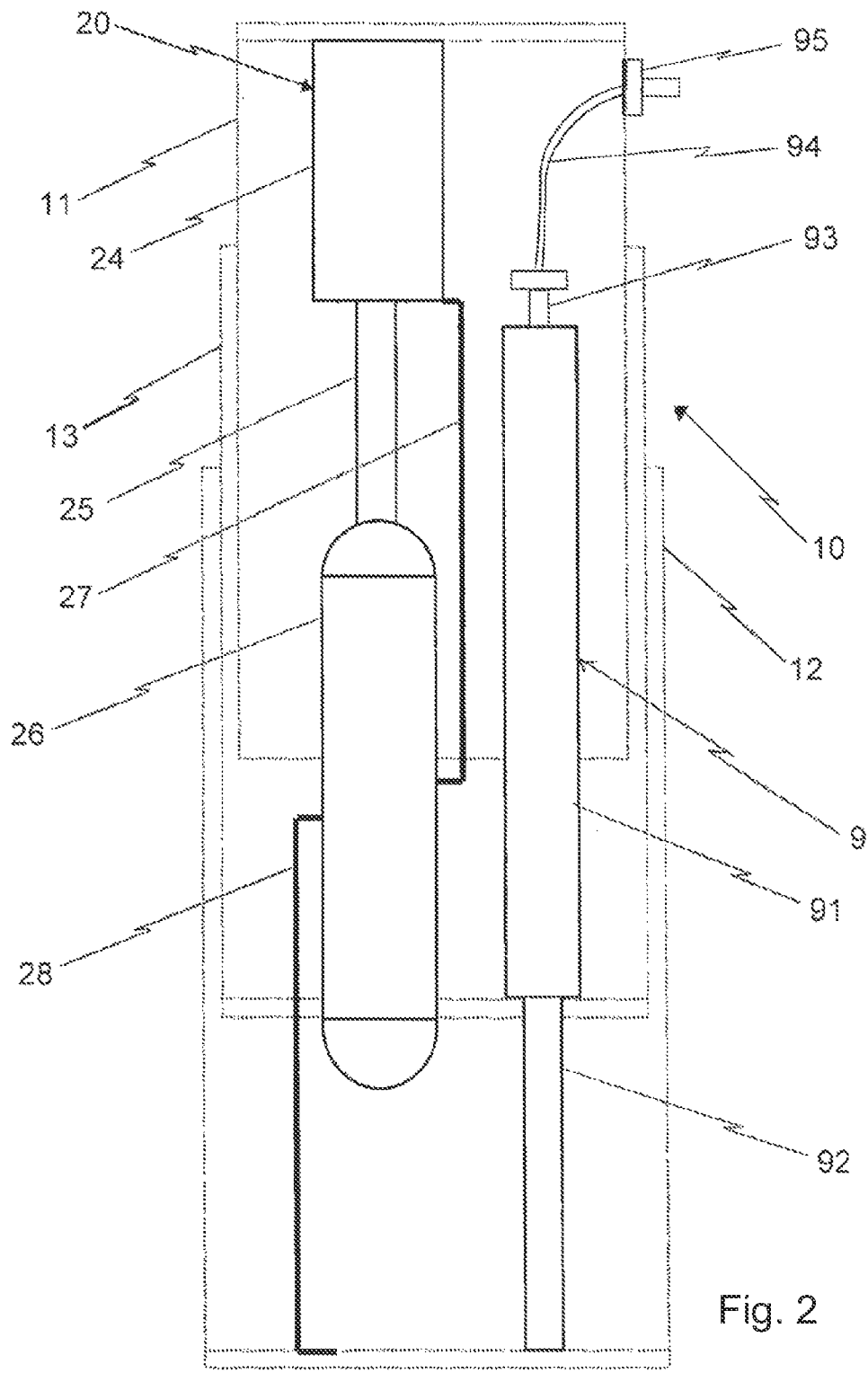
FIG. 2 shows an embodiment of a table column with a gas pressure spring according to the invention.

FIG. 2 shows another embodiment of the gas pressure spring in conjunction with a table column 10. The table column 10, in the embodiment shown, includes three column elements 11, 12, 13, which are telescopically insertable into each other, as is already described with respect to FIG. 1. The number of columns is not relevant to the spirit of the invention and it is also conceivable that more or less columns are provided without deviating from the spirit of the invention. Fastening of the piston 92 of the gas pressure spring portion is performed in a conventional manner, analogously to FIG. 1. Similarly, fastening or coupling of the upper portion of the gas spring portion is performed.

In the embodiment shown in FIG. 2, the adjustable column 10 is a drive column with a plurality of, three in this case, telescopic parts 26, 27 and 28 and an adjusting unit 20. The adjusting unit 20 comprises an electric drive motor 24. Here, the drive motor 24 is arranged at an end plate, which is provided at an upper end of the column 10. Furthermore, the column 10 comprises a threaded spindle 25, which is arranged on the central telescopic part 26 and is driven by the drive motor 24. In an extended state to the column, the threaded spindle 25 and the upper telescopic part 27 are at least partially at the height of the inner column 11.

The central telescopic part 26 adjoins the upper telescopic part 27 or the threaded spindle 25, wherein the central telescopic part 26 is arranged such that it is at least partially surrounded by the upper and lower telescopic parts 27 and 28 and may be moved along the threaded spindle 25 in parallel to the upper telescopic part 27. The lower telescopic part 28 extends up to the bottom of the lower column element 13 and may be fastened there by suitable fastening means.

Also at the bottom of the lower column element, a gas pressure spring 9 is provided. The gas pressure spring 9, in the embodiment shown, comprises a cylinder 91 and a piston 92. Here, one end of the piston 92 is fastened at the bottom of the lower column element 11, while the other end is received in the cylinder 91. Also, a top of the cylinder 91 is connected to the central column element 13. Of course, in other embodiments, the column may have only two column elements and, in this case, the cylinder might be connected to the upper column element. Accordingly, a plurality of column elements may be provided.

In a further alternative embodiment, a bottom of the cylinder 91 may be fastened at the top of the upper column element 12 and the top of the piston 92 may be fastened at the bottom of the central or of the lower column element 11, 13.

Hence, the arrangement of the gas pressure spring 90 is preferably configured such that the force is conveyed between two telescopic columns elements, so that the lifting capacity of the drive motor is supported, or a weight load on the column from above is counteracted.

The valve 93, which is located at the gas pressure spring portion, is in turn connected to another valve 95 via the connecting means 94. The valve 95 extends from the interior of the column to the outside world, such that a retracting movement of the telescopic columns is not inhibited, while connecting the valve to a gas reservoir 96 (not shown in FIG. 2) is possible. For this purpose, in the present case an opening is formed in the inner column 11, that is, the upper column. Through this opening the valve 95 extends in the radial direction out of the column 10.

Figure 3:
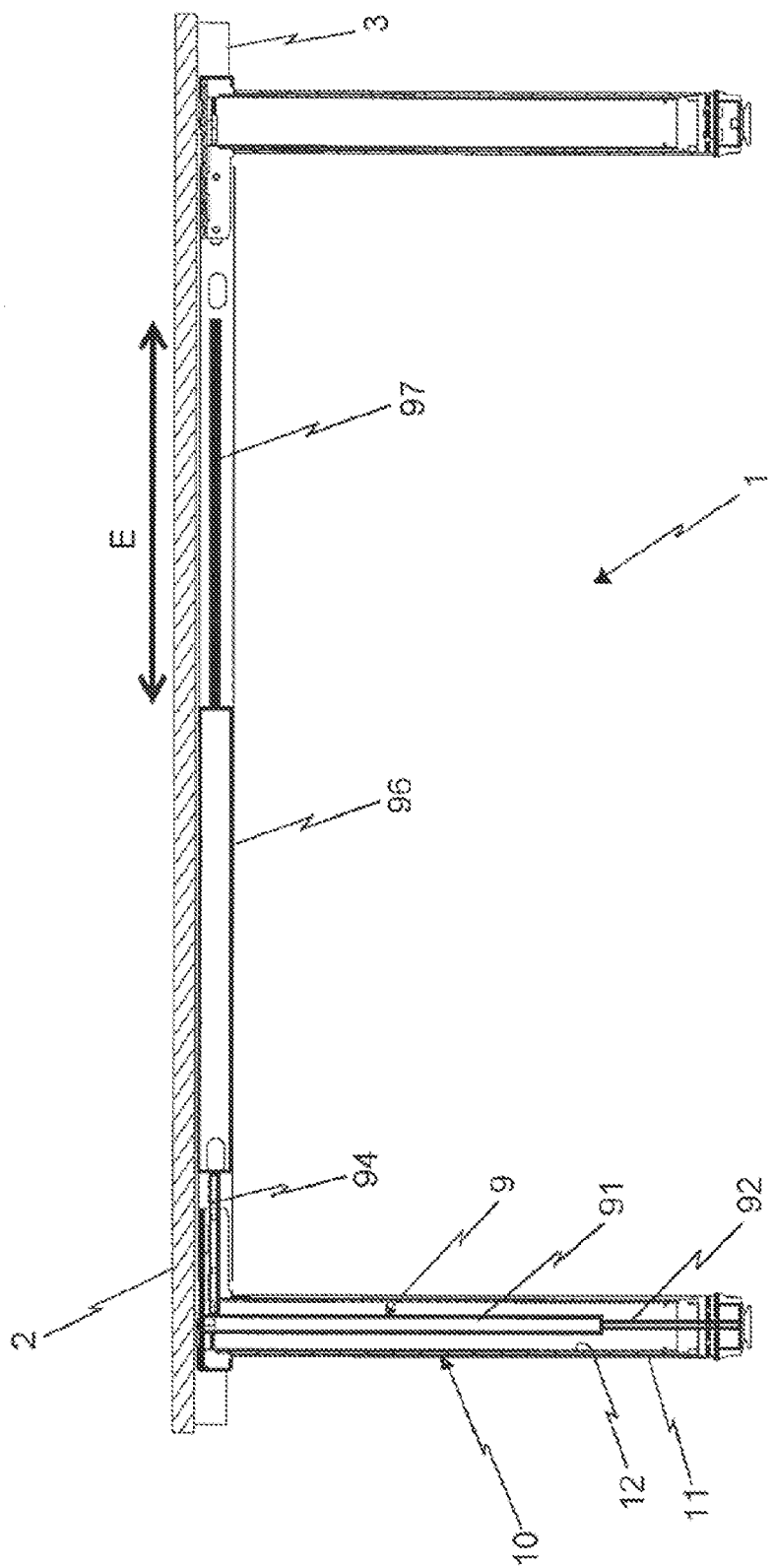
FIG. 3 shows a table with the gas pressure spring gas pressure spring according to one embodiment of the invention.

FIG. 3 shows an exemplary embodiment of a table according to the present invention having a table column, which is provided with a gas pressure spring damping according to the invention. The table 1 comprises a plurality of columns 10, specifically four columns 10, of which only two columns 10 are visible in the side view. The columns 10 are connected to a table frame 3. Above the columns 10 and the table frame 3 a table plate 2 is disposed. In one of the table columns 10 a gas pressure spring portion 91, 92 of a gas pressure spring 9 according to the invention is arranged. This arrangement can for example be as shown in FIG. 1, or the column of FIG. 3 may be motor-driven, as shown in the embodiment of FIG. 2. At the table frame 3 the gas reservoir 96 is provided. In addition, the connecting means 94 is formed along the frame 3 from the gas reservoir to the cylinder 91 of the gas pressure spring portion.

The piston 97 is movable along an adjustment range E indicated in FIG. 3 by the double arrow in the axial direction along the extension of the gas reservoir 96, along the frame 3. Thus, an adjustment of the pressure in the gas reservoir 96 may be performed by changing the position or the depth of penetration of the piston 97 relative to the gas reservoir.

In alternative embodiments, more than one column may include a gas spring portion 91, 92. Here, either a gas reservoir may be provided for each gas spring portion or a gas reservoir is provided as a gas reservoir 96 for more than one gas spring portions, in particular for all gas spring portions of the table columns.

Figure 4:
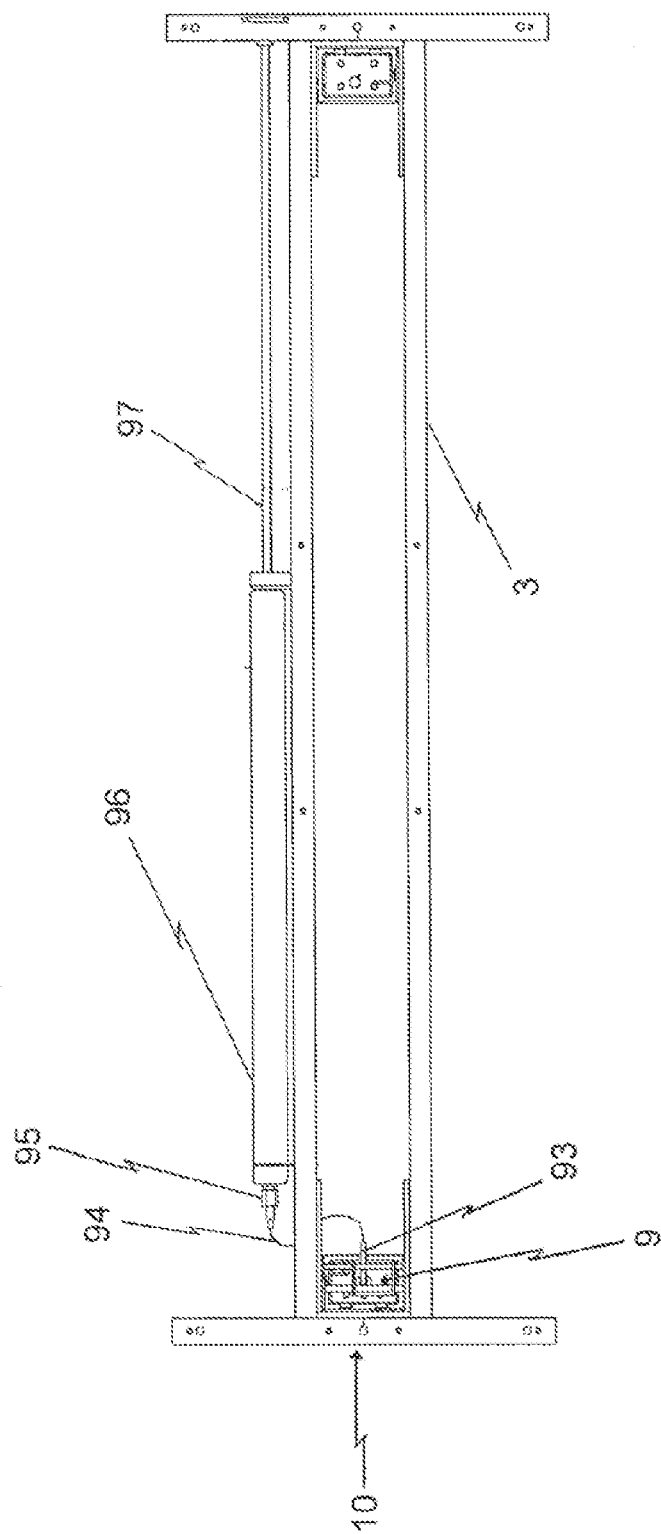
FIG. 4 shows a plan view of the table of FIG. 3.

FIG. 4 shows a plan view of the table according to the embodiment shown in FIG. 3, wherein a fastening of the gas reservoir 96 and the piston rod 97 along the frame 3 is noticeable. Here, the gas reservoir 96 is formed below a table plate, which, in the assembled state, is supported by the frame.

Figure 5:
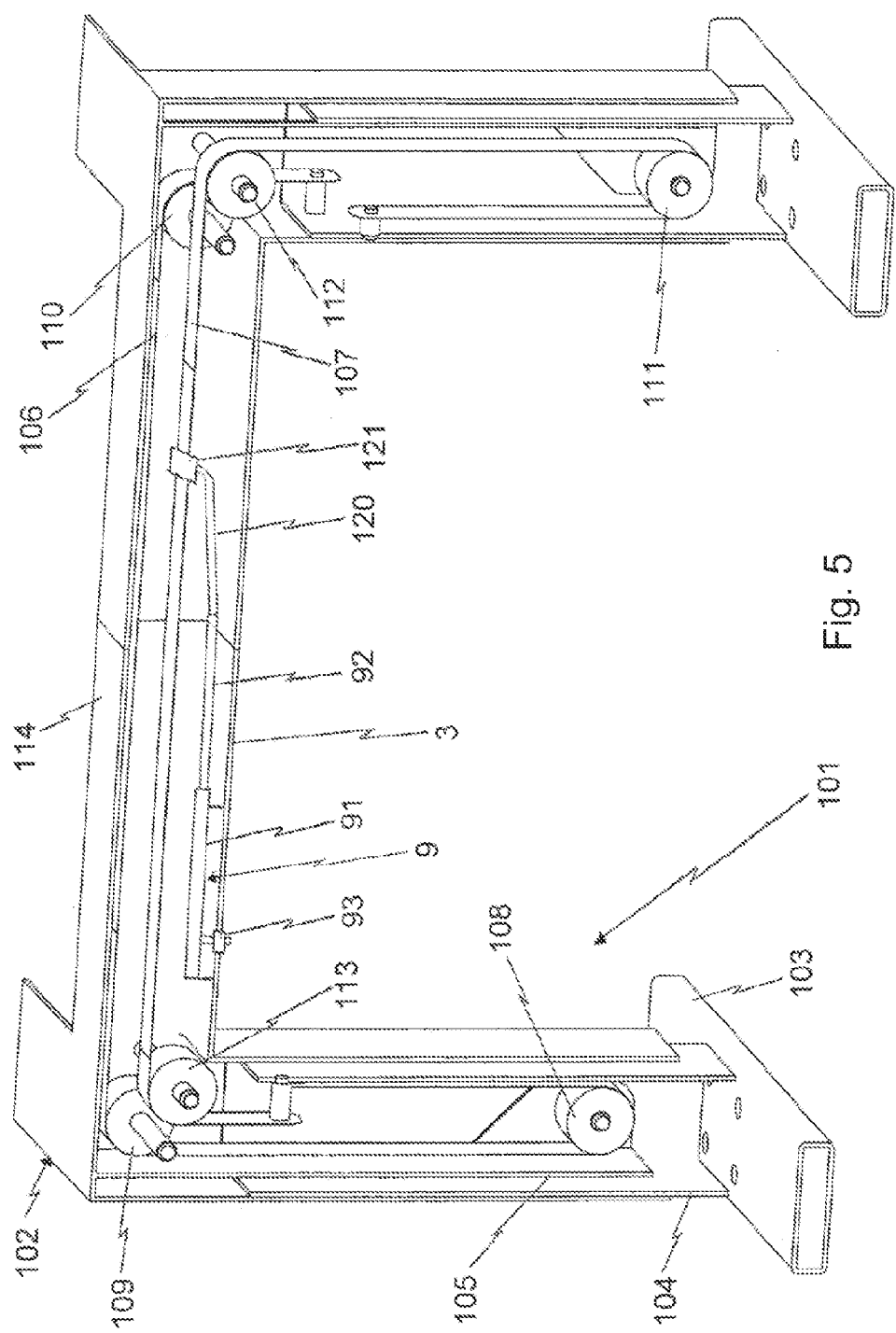
FIG. 5 shows another embodiment of a table with a gas spring according to the invention.

FIG. 5 shows an alternative embodiment of a height-adjustable table according to the present invention. Here, a table 101 is formed with a synchronization means, in this case belt synchronization.

The height-adjustable table 101 comprises table plate holding component 102 with inverted U-shape and two foot components 103 with inverted T-shape. The foot components 103 include a vertical element 104, which essentially corresponds to the lower column element of the embodiments described above, encloses a space as a hollow profile and is open at the top. The table plate holding component 102 comprises two vertical supports 105 inserted into the vertical elements 104 from above. The vertical elements 104 and the vertical supports 105 are connected to each other such that a relative movement of the vertical elements 104 with respect to the vertical supports 105 in the vertical direction is possible.

Further, the height-adjustable table frame comprises two steel belts 106 and 107, which are guided via guide rollers 108, 109 and 110 or 111, 112 and 113.

As is further apparent from FIG. 5, the guide rollers 108 and 111 are arranged rotatably at the lower end of the vertical support 105. The guide rollers 109, 110, 112 and 113 are mounted rotatably at a transverse beam 114 of the table plate holding component 102. The steel belt 106 is fastened at an upper end of a vertical element 104, is vertically guided down to the roller 108, deflected around the roller 108, guided vertically up to the roller 109, deflected around the roller 109, guided horizontally to the roller 110, deflected around the roller 110, guided vertically to an upper end of the other vertical member 104 and fastened there. The steel belt 107 is guided in a similar, but mirrored way around the other guiding rollers 111, 112 and 113 and fastened at its ends.

In the embodiment of FIG. 5 the gas reservoir 96 is formed between a bottom of the frame 3 and the table plate component 102 or the transverse beam 114 thereof. The gas pressure spring portion 91 is connected to a connecting element 120 via the piston 92. The connecting element, in turn, is connected to a fastening element 121. Here, the fastening element 121 is formed as a belt lock which is connected to the belt or one of the belts to synchronize the table adjustment. In this way, a height adjustment in a table with said belt synchronization may be aided by adjusting the spring force of the gas pressure spring 9 or, in an extreme case, an adjustment may be inhibited.

As described above in conjunction with the column according to the embodiment of FIG. 2, the gas pressure spring portion is connectable via a valve 93 to a gas reservoir, which, in the illustrated embodiment, is not provided permanently at the table 101. However, this may be the case, of course, in alternative embodiments.

Hereafter, the functionality of the gas spring according to the present invention when used in a table column or a table will be explained by way of example. As mentioned above a gas pressure spring in a table column is used for compensating the weight resting on the column. In particular, for tables with a fluctuating load, which at the same time are required to be height-adjustable, spring forces that are too high or too low might occur. This can happen, if the spring is adjusted to a weight range, while the load of the table is subsequently increased or decreased significantly. If the load on a table is increased, increasing the weight load on the column and the gas spring, it is possible to increase the gas pressure in the gas spring portion 91 by adjusting the pressure in the gas reservoir, for example, by inserting a piston rod into the gas reservoir 96 via the connecting means 94. Thus, an adjustment of the spring force to the increased weight load can be obtained. As an alternative to the gas reservoir 96 with a piston rod 97, a gas reservoir can be provided which is, by itself, a pressurized gas container, wherein gas is communicated via the connecting means 94 to the gas spring portion 91 of the gas pressure spring 9 using a valve.

For implementing a table with a gas spring 9 according to the invention it is therefore necessary, that there is a force coupling between the gas pressure spring 9 and the gas pressure spring portion 91 and the weight-bearing part to be height-adjusted such as the table plate. Here, as shown in the embodiment of FIG. 5, the gas pressure spring portion 91 may also be arranged horizontally, that is, in a direction perpendicular to the up-down direction.

Thus, for example, the lifting capacity of a motor column may be increased with a gas pressure spring according to the invention. This will be illustrated in a not-limiting example of the invention. The engine output may be, for example, directed to the load center. The motor may, for example, not be configured to lift the table, but rather to pull down the table counteracting the gas pressure spring. An exemplary table with two motor columns, each able to lift 80 kg, would not only be able to lift 160 kg, but up to 320 kg with two 160 kg gas pressure springs.

It is also conceivable that the motors are configured to lift, wherein two 80 kg motors and two 80 kg gas pressure springs can support a load of 320 kg.

In order to further increase that, the base load, i.e., the table plate or the attachments can be compensated by gas pressure springs. For example, if a motor column can lift 80 kg, two columns can lift 160 kg. If the table plate weighs, for example, a ton, said weight is compensated by the gas pressure spring or springs, and thus, neglecting gas pressure spring hysteresis for the illustrative example, the table may in turn be driven with an additional weight of 160 kg. The columns then lift 1160 kg. The free adjustment of the gas spring according to the invention used here makes a varying use of the tables possible, even at the customer. This can be used especially advantageously in the industrial applications with very high weights and long-term usage of the tables, for example, in different production lines.

In summary, an adjustable gas spring 9 comprises a gas pressure spring portion 91, 92, a gas reservoir 96 and a connecting means 94 fluidically connecting the gas reservoir 96 and the gas pressure spring portion 91, 92 with each other. The spring force of the gas pressure spring portion 91, 92 is adjustable by means of pressure equalization with the gas reservoir 96 and/or the ambient pressure. Such a gas spring may be provided in an adjustable column 10, 104, 105, in particular an adjustable table column. Such a table column may in turn be provided in a height-adjustable table 1, 101.

LIST OF REFERENCE NUMBERS

1 table
2 table plate
3 table frame
9 gas pressure spring
10 adjustable column
11 lower column element
12 upper column element
13 central column element
14 stopper
20 adjusting unit
24 drive motor
25 threaded spindle
26 central telescopic part
27 upper telescopic part
28 lower telescopic part
91 cylinder
92 piston
93 cylinder valve
94 connecting means
95 valve
96 gas reservoir
97 piston rod
102 table plate holding component
103 foot component
104 vertical element
105 vertical support
106 steel belt
107 steel belt
108 guide roller
109 guide roller
110 guide roller
111 guide roller
112 guide roller 113 guide roller
114 transverse beam
120 connecting means
121 belt lock

What is claimed is:

1. A height-adjustable table comprising:
    a first table column for performing a first adjustment of a height of the table; the first table column comprising
        a lower column element and an upper column element, the lower column element and the upper column element being moveable with respect to each other;
        an adjustable gas pressure spring disposed in the first table column, the adjustable gas pressure spring comprising a gas spring portion and a gas reservoir;
        a connector for placing the gas spring portion and the gas reservoir in fluid connection with each other, the gas spring portion having a spring force, the spring force being adjustable by pressure equalization with the gas reservoir or an ambient pressure;
    a second table column for performing a second adjustment of the height of the table, the second table column lacking a gas pressure spring;
    a synchronizer for synchronizing the first adjustment of the height and the second adjustment of the height; and
    a weight meter or a weight indicator for measuring or indicating an actual weight load of the table.

2. The height-adjustable table of claim 1, further comprising
    a table plate; and
    a lock for locking a position of the table plate in a vertical direction.

3. The height-adjustable table of claim 1, wherein the gas reservoir comprises an adjuster for adjusting a pressure in the gas reservoir.

4. The height-adjustable table of claim 1, wherein the spring force is controlled by the adjuster or by connecting to an external gas reservoir.

5. The height-adjustable table of claim 1, wherein the weight meter or the weight indicator is disposed in the first table column.

6. A height-adjustable table comprising:
    a first table column for performing a first adjustment of a height of the table; the first table column comprising
        a lower column element and an upper column element, the lower column element and the upper column element being moveable with respect to each other;
        an adjustable gas pressure spring disposed in the first table column, the adjustable gas pressure spring comprising a gas spring portion and a gas reservoir;
        a connector for placing the gas spring portion and the gas reservoir in fluid connection with each other, the gas spring portion having a spring force, the spring force being adjustable by pressure equalization with the gas reservoir or an ambient pressure;
    a second table column for performing a second adjustment of the height of the table, the second table column lacking a gas pressure spring;
    a synchronizer for synchronizing the first adjustment of the height and the second adjustment of the height; and
    a pressure indicator for indicating a pressure in the gas pressure spring or an adjusted weight compensation.

7. The height-adjustable table of claim 6, wherein the pressure indicator is disposed in the first table column or the gas pressure spring.

8. A height-adjustable table comprising:
    a first table column for performing a first adjustment of a height of the table; the first table column comprising
        a lower column element and an upper column element, the lower column element and the upper column element being moveable with respect to each other;
        an adjustable gas pressure spring disposed in the first table column, the adjustable gas pressure spring comprising a gas spring portion and a gas reservoir;
        a connector for placing the gas spring portion and the gas reservoir in fluid connection with each other, the gas spring portion having a spring force, the spring force being adjustable by pressure equalization with the gas reservoir or an ambient pressure;
    a second table column for performing a second adjustment of the height of the table, the second table column lacking a gas pressure spring;
    a synchronizer for synchronizing the first adjustment of the height and the second adjustment of the height; and
    a common display for indicating an actual weight load of the table and for indicating an adjusted weight compensation.

9. The height-adjustable table of claim 8, wherein the common display is disposed in the first table column or the gas pressure spring.

10. A height-adjustable table comprising:
    a first table column for performing a first adjustment of a height of the table; the first table column comprising
        a lower column element and an upper column element, the lower column element and the upper column element being moveable with respect to each other;
        an adjustable gas pressure spring disposed in the first table column, the adjustable gas pressure spring comprising a gas spring portion and a gas reservoir;
        a connector for placing the gas spring portion and the gas reservoir in fluid connection with each other, the gas spring portion having a spring force, the spring force being adjustable by pressure equalization with the gas reservoir or an ambient pressure;
    a second table column for performing a second adjustment of the height of the table, the second table column lacking a gas pressure spring;
    a synchronizer for synchronizing the first adjustment of the height and the second adjustment of the height; and
    a securer for permitting an adjustment of the first table column only if a weight compensation adjustment of the gas pressure spring and a weight load of the table are sufficiently similar.

11. A height-adjustable table comprising:
    a first table column for performing a first adjustment of a height of the table; the first table column comprising
        a lower column element and an upper column element, the lower column element and the upper column element being moveable with respect to each other;
        an adjustable gas pressure spring disposed in the first table column, the adjustable gas pressure spring comprising a gas spring portion and a gas reservoir;
        a connector for placing the gas spring portion and the gas reservoir in fluid connection with each other, the gas spring portion having a spring force, the spring force being adjustable by pressure equalization with the gas reservoir or an ambient pressure;
    a second table column for performing a second adjustment of the height of the table, the second table column lacking a gas pressure spring;
    a synchronizer for synchronizing the first adjustment of the height and the second adjustment of the height;
    a table plate; and
    a lock for locking a position of the table plate in a vertical direction;
    wherein the lock locks the synchronizer.

12. The height-adjustable table of claim 11, wherein the synchronizer is a belt synchronizer.

13. A height-adjustable table comprising:
a first table column for performing a first adjustment of a height of the table; the first table column comprising
    a lower column element and an upper column element, the lower column element and the upper column element being moveable with respect to each other;
    an adjustable gas pressure spring disposed in the first table column, the adjustable gas pressure spring comprising a gas spring portion and a gas reservoir;
    a connector for placing the gas spring portion and the gas reservoir in fluid connection with each other, the gas spring portion having a spring force, the spring force being adjustable by pressure equalization with the gas reservoir or an ambient pressure;
a second table column for performing a second adjustment of the height of the table, the second table column lacking a gas pressure spring;
a synchronizer for synchronizing the first adjustment of the height and the second adjustment of the height;
a table plate; and
a lock for locking a position of the table plate in a vertical direction;
wherein the lock is coupled to the gas pressure spring.

14. A height-adjustable table comprising:
a first table column for performing a first adjustment of a height of the table; the first table column comprising
    a lower column element and an upper column element, the lower column element and the upper column element being moveable with respect to each other;
    an adjustable gas pressure spring disposed in the first table column, the adjustable gas pressure spring comprising a gas spring portion and a gas reservoir;
    a connector for placing the gas spring portion and the gas reservoir in fluid connection with each other, the gas spring portion having a spring force, the spring force being adjustable by pressure equalization with the gas reservoir or an ambient pressure;
a second table column for performing a second adjustment of the height of the table, the second table column lacking a gas pressure spring; and
a synchronizer for synchronizing the first adjustment of the height and the second adjustment of the height;
wherein the spring force is controlled by connecting to an external gas reservoir, the external gas reservoir being configured as an external pressurized gas cylinder reversibly connectable to the gas spring portion of the gas pressure spring via a further connector.

15. A height-adjustable table comprising:
a first table column for performing a first adjustment of a height of the table; the first table column comprising
    a lower column element and an upper column element, the lower column element and the upper column element being moveable with respect to each other;
    an adjustable gas pressure spring disposed in the first table column, the adjustable gas pressure spring comprising a gas spring portion and a gas reservoir;
    a connector for placing the gas spring portion and the gas reservoir in fluid connection with each other, the gas spring portion having a spring force, the spring force being adjustable by pressure equalization with the gas reservoir or an ambient pressure;
a second table column for performing a second adjustment of the height of the table, the second table column lacking a gas pressure spring; and
a synchronizer for synchronizing the first adjustment of the height and the second adjustment of the height;
wherein the gas reservoir comprises an adjuster for adjusting a pressure in the gas reservoir;
wherein said adjuster comprises a piston rod insertable into the gas reservoir.

16. A height-adjustable table comprising:
a first table column for performing a first adjustment of a height of the table; the first table column comprising
    a lower column element and an upper column element, the lower column element and the upper column element being moveable with respect to each other;
    an adjustable gas pressure spring disposed in the first table column, the adjustable gas pressure spring comprising a gas spring portion and a gas reservoir;
    a connector for placing the gas spring portion and the gas reservoir in fluid connection with each other, the gas spring portion having a spring force, the spring force being adjustable by pressure equalization with the gas reservoir or an ambient pressure;
a second table column for performing a second adjustment of the height of the table, the second table column lacking a gas pressure spring; and
a synchronizer for synchronizing the first adjustment of the height and the second adjustment of the height;
wherein the gas reservoir comprises an adjuster for adjusting a pressure in the gas reservoir;
wherein the adjuster is adjustable with a crank or a screwdriver or a battery-powered screwdriver or a screwing or engaging means.

* * * * *